Oct. 11, 1960
H. GRUBER ET AL
2,956,098
FEED CONTROL FOR VACUUM ARC SMELTING FURNACE
Filed May 13, 1957
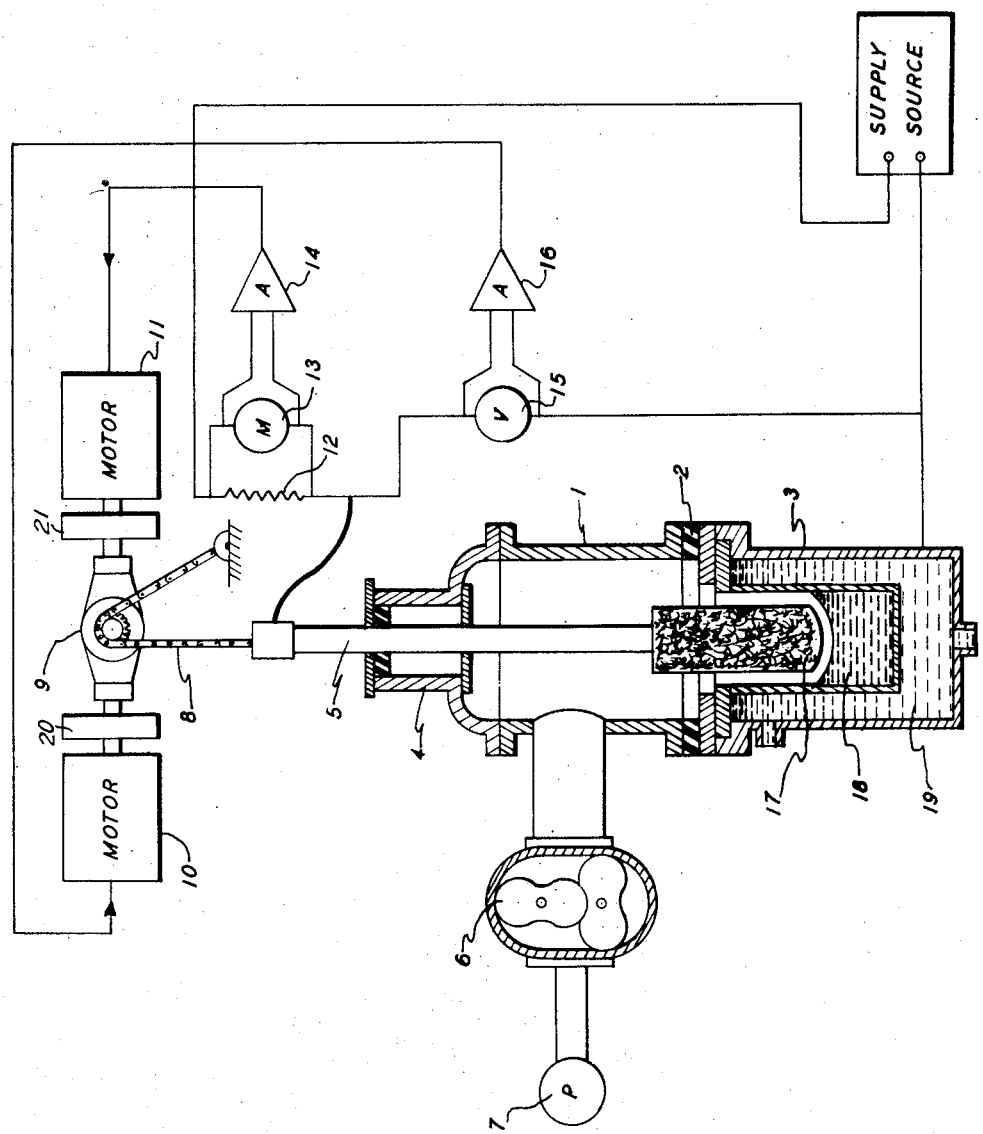
INVENTORS
*HELMUT GRUBER
HELMUT SCHEIDIG*
BY
*Christie, Parker & Hale*
ATTORNEYS

2,956,098

FEED CONTROL FOR VACUUM ARC SMELTING FURNACE

Helmut Gruber and Helmut Scheidig, Hanau (Main), Germany, assignors to W. C. Heraeus G.m.b.H., Hanau (Main), Germany, a corporation of Germany Filed May 13, 1957, Ser. No. 658,667

Claims priority, application Germany Nov. 20, 1956

3 Claims. (Cl. 13—13)

The present invention relates to improvements in vacuum arc smelting furnaces.

Although electric arcs have been used for a long time for many different purposes, it has always been one of the most difficult problems, particularly in arc welding and arc smelting, to find the most suitable means for controlling the proper feeding of the electrodes. In more recent times, efforts have been made to avoid manually controlled feeding means and to carry out the feeding fully automatically, either by regulating its speed in different speed ranges or by infinitely varying the feeding speed. The important object which should be attained by such feed control means is to regulate the conditions which allow the arc to burn so as to remain as constant as possible. The adjustment of the feeding movement of the electrode must therefore occur so rapidly that the burning conditions of the arc will never vary to any considerable extent from the normal standard.

The problem of feeding the electrode at the proper rate of speed is particularly difficult if the arc is required to burn within an inert gas under a pressure below atmospheric. It is even more difficult to control the proper burning of the arc if it is to occur in a vacuum, that is, under a pressure of less than 0.5 mm. mercury column. This applies particularly to vacuum arc furnaces used for smelting. More recently, many metals having a high melting point such as, for example, molybdenum, zirconium, and titanium, but also metals such as high-alloyed steel, are smelted either under reduced pressure in a rare gas atmosphere or solely in a high vacuum. As compared with smelting within an inert gas, the smelting in a vacuum has the considerable advantage that the metals will thereby be more easily and highly freed of gases and, especially, that the hydrogen content of such metals may thus be reduced to very low limits.

Such smelting processes are usually carried out by means of consumable electrodes, that is, such electrodes, the metal of which melts off under the heat of the electric arc and forms a pool of molten metal which then solidifies into an ingot. These electrodes thus consume themselves and must be continuously fed at a proper speed.

It has now been found to be extremely difficult to control the proper burning of an arc if it occurs in a container in which a pressure of $10^{-1}$ mercury column or even a lower pressure is maintained. This means that there is then no discharge carrier available for igniting the arc or for maintaining the same. Therefore, the vapor pressure which an arc requires in order to burn in a vacuum arc furnace must be produced by the arc itself by partial evaporation of the melting metal. Thus, the arc will then burn within the metallic vapor which it forms. In order to produce immediately the amount of metallic vapor necessary for igniting the arc, the electric current required must be of a very high intensity. Practical experience has shown that the properties of an electric arc burning in a vacuum in such a self-produced atmosphere of metallic vapor differ widely from those of an arc burning under a higher atmospheric pressure. This is true particularly for the gradient of the discharge potential, i.e. the voltage drop per centimeter of the distance between the electrodes, which is one order of magnitude smaller than that of arcs burning under a pressure above 1 mm. mercury column. Recent tests have shown that the voltage drop per centimeter of the arc length amounts at pressures of 1 mm. or more to about 10 volts, while in a vacuum it amounts to only 0.4 volt. Evidently, such a small potential gradient necessarily requires a very sensitive feed control of the electrode and incurs very difficult problems.

The feeding of an electrode within a vacuum arc furnace should be controlled so that the electrode will always remain within a certain minimum and maximum distance from the pool of metal. The minimum distance is determined by the continuous motion of the surface of the pool of molten metal, and by the requirement that falling drops of molten metal should cause only short circuits of as short a duration as possible. In determining the maximum length of the arc it is necessary to consider that an arc beyond a certain length will incur the danger that it might pass to the wall of the crucible. Since this must be avoided under any circumstances, the arc should always be shorter than the distance between the electrode and such wall. It should therefore be relatively short and be allowed to vary only within very small limits.

Since consumable electrodes consist of compressed granular or spongy material, they are never entirely uniform throughout their length. Consequently, they also do not melt off uniformly. This, in combination with the small voltage and distance limits within which the control of the arc has to be carried out, enhance the difficulties which have to be overcome.

Further difficulties arise through the following facts: The gases occluded in the metal to be melted differ widely in quantity or volume. They may be present either in the metal itself or within the small closed cavities in the compressed electrodes. Although in the operation of a vacuum arc furnace such gases will be continuously absorbed, their liberation will momentarily more or less affect the characteristics of the arc. For this reason, a thin electrode in a crucible of a relatively large diameter will promote a quick evacuation of such gases.

On the other hand, if a thin electrode is used the danger will arise that the surface of the ingot will not melt up to the wall of the crucible and that therefore the ingot will not be homogeneous. Although a thicker electrode will insure a thorough melting of the entire material, such electrode means a more incomplete evacuation of the liberated gases and an increased danger of arc discharges toward the wall of the crucible. The most favorable diameter of the electrodes should therefore remain within a specific relation to the diameter of the crucible. Although with such short arc lengths it may happen occasionally that a strong wave motion of the molten pool or the dripping of molten metal from the electrode will result in short circuits of the arc of a short duration, such short circuits may be accepted in view of the advantages of a shorter arc length.

Arc discharges passing toward the wall of the crucible are very dangerous since the arc may perforate the wall separating the crucible from its water-cooling jacket. An entry of water into a vacuum arc furnace may, however, have very serious consequences and even result in very serious explosions of the furnace. For this reason it is advisable or even necessary to make the length of the arc between the electrode and the pool of molten metal smaller than the distance between the electrode and the wall of the crucible. In actual practice, such arc lengths should preferably lie within 10 and 20 mm.

Since it is essential that the extent or direction of the arc be limited to the distance between the electrode and the pool, and since the arc must be prevented from deflecting laterally toward the wall of the crucible, it is unavoidable in view of the required short arc length that even the most perfectly regulated feed control mechanism might occasionally incur short circuits. The feed control mechanism must, however, be designed so as to react so quickly that the short circuits will only last a very short time, since the material after melting will otherwise be inhomogeneous.

Another difficulty is that the consumable electrodes of larger arc furnaces are of considerable size and that the charges worked up in such a furnace by such electrodes in one smelting process are not merely those of a few pounds but have a considerable weight which often is as high as several tons.

These weights change considerably as the electrodes are being consumed. This, in turn, requires special means for compensating such differences in weight, which constitutes another important distinction between vacuum arc furnaces and ordinary arc furnaces, for example, those in which carbon electrodes are used which are consumed very slowly.

It is therefore an object of the present invention to provide a feed control for the electrode of a vacuum arc furnace which overcomes all the mentioned difficulties and is not only very sensitive but also reacts very quickly to overcome the heavy weight and large inertia of such electrode in its movement in either direction.

It is another object of the present invention to provide a feed control mechanism which considerably reduces the possibility of mechanical breakdowns and the danger of explosions and other accidents in the operation of the furnace.

The feed control mechanism according to the invention which has already proved highly successful in normal large-scale production of ingots and which permits such production on a continuous scale, permits the arc length to be held within very small limits so that the average distance between the electrodes remains between 10 to 20 mm. This permits an operation free of accidents, a fact which distinguishes the new control mechanism from other known control means which require larger distances between the electrodes and have for this reason alone led to serious explosions.

The present invention resides in providing a feed control mechanism for a consumable electrode of a vacuum arc furnace, which is characterized by having a very low inertia. This is attained according to the invention by providing a pair of motors, so-called forward and reverse motors which rotate continuously and in opposite directions, and are interconnected by a differential gearing and suitable amplifying means for controlling the operation of such mechanism.

Further objects, features, and advantages of the present invention will be apparent from the following detailed description thereof, particularly when read with reference to the accompanying drawing.

As shown in this drawing, the vacuum arc furnace consists of a bell-shaped upper part 1 and a lower part 3 forming a crucible and having a water-cooling system 19 surrounding the same. Both parts are electrically insulated from each other by an insulating ring 2. The upper part 1 has a socket 4 at its upper end which guides a suspension rod 5 carrying the electrode 17 for vertical sliding movement therein and is provided with suitable means to prevent any substantial release of the vacuum which is maintained within the furnace.

The electric arc burns between electrode 17 and the pool of molten metal 18 formed within crucible 3. It is operated at a tension which may be inspected on a voltmeter 15. The flow of current is indicated by a shunted instrument 12, 13, and the voltage and amperage of the current control the feed of electrode 17 by means of sensitive amplifiers 14 and 16.

The feed of electrode 17 is carried out through suspension rod 5 and a chain 8 by a differential gear 9 which is driven by a pair of motors 10 and 11. The operation of the differential gear 9 to advance or retract the electrode is controlled by the difference in the rate of speed of these motors 10 and 11 which rotate continuously and in opposite directions. At least one or both motors 10 and 11 are controlled by amplifiers 14 and 16. Since the motors run continuously, the reaction of the feed mechanism will be very short. It may be further reduced if the amplifiers 14 and 16 are designed so as to overcompensate the control impulses so that the moments of inertia which oppose a quick change of the speed of rotation will thus be balanced.

One of the points to be observed in designing the control system is that the feed unit 9, 10, 11 should possess sufficient strength in order to overcome the considerable weight of suspension rod 5 and electrode 17. Furthermore, it must be designed so as to prevent any possibility that the electrode might drop downwardly in the event that the current might be interrupted. This may be attained by the provision of self-locking gears 20 and 21 between motors 10 and 11 and the differential gear 9. Such self-locking gears 20 and 21 are well known in the art. For example, see the self-locking gear arrangements or automatic braking mechanisms described in pages 218 through 220 of "Ingenious Mechanisms for Designers and Inventors" volume II, published by the Industrial Press of New York City, 6th printing, 1945.

The current for driving motors 10 and 11 should also have such a mean voltage that any change in voltage will result in a maximum change in the speed of the motors and thus in the feeding speed. Such most suitable voltage need, however, not be identical with the normal operating voltage.

By applying the proper kind of amplifiers 14 and 16, it is thus possible with the aid of relatively simple means to attain a high sensitivity, a very small time constant, control impulses of any desired value, and a practically unlimited possibility of adjusting these values during the operation of the furnace. Such amplifiers are easily adaptable to the conditions prevailing in the smelting process and to any changes in these conditions.

The inventive feed mechanism 9, 10, 11 with two continuously running motors also reacts very rapidly to the control impulses furnished by amplifiers 14 and 16. If these motors rotate, for example, at a speed of 1500 r.p.m., a change in such speed by only a few percent will be carried out very quickly and thus result in a quick advancing or retracting movement of electrode 17.

The furnace according to the invention may be evacuated by means of a pump unit consisting, for example, of a Root's-type pump 6 and a preliminary pump 7.

The present feed control according to the invention is far superior to similar units as known in the art which operate with a single motor and rotary amplifiers, usually of the magnetic type. The reaction period of such control units is far too long since the adjustment of the magnetic field of the amplifiers requires a considerable time. They have not proved satisfactory and do not solve the objects of the present invention since the time constant of these units did not protect the furnace from short circuits of a longer duration or from arc discharges toward the walls of the crucible. Even by connecting additional electronic amplifiers in series with the magnetic rotary amplifiers in order to increase the sensitivity of the control unit, it has not been possible to solve these difficulties since such provision cannot reduce the time required for adjusting the magnetic field of the main amplifiers.

The amplification according to the present invention in combination with a feed unit consisting of two continuously rotating motors insures a safe and proper feed control. No time will be lost for producing magnetic amplifier fields, and no more than the small mass moments of the inertia of the motors rotating continuously in opposite directions has to be overcome in order to actuate the feed of the electrode either in the forward or reverse direction.

While the invention has been described in detail with reference to certain now preferred examples and embodiments thereof, it will be understood by those skilled in the art that various changes and modifications may be made without departing from the spirit and scope of the invention as defined in the appended claims.

The invention having now been fully disclosed, that which is claimed as new is:

1. In an arc furnace including a crucible for holding a pool of molten metal therein, a consumable electrode constructed and arranged to be moved toward and away from the crucible and a source of electric current connected between the crucible and the electrode for forming an arc between the electrode and the molten pool, the combination which comprises a pair of electric motors constructed and arranged to rotate continuously in opposite directions to each other, a differential gearing interconnecting the motors, means for connecting the gearing to the end of the electrode remote from the crucible, a source of electric current for driving the motors, means responsive to the voltage and current of the arc and to changes in the voltage and current of the arc from a predetermined standard arc voltage and arc current, respectively, for controlling the speed of at least one of the motors to maintain the voltage and current of the arc at substantially the predetermined standard voltage and current, respectively, and means for locking the electrode against downward movement in the event of interruption of supply of electric power from the said current sources.

2. In an arc furnace including a crucible for holding a pool of molten metal therein, a consumable electrode constructed and arranged to be moved toward and away from the crucible and a source of electric current connected between the crucible and the electrode for forming an arc between the electrode and the molten pool, the combination which comprises a pair of electric motors constructed and arranged to rotate continuously in opposite directions to each other, a differential gearing unit interconnecting the motors, means for connecting the gearing unit to the end of the electrode remote from the crucible, a source of electric current for driving the motors, first means responsive to the arc voltage and to changes in the arc voltage from a predetermined voltage for controlling the speed of one of said motors to maintain the arc voltage at substantially the predetermined voltage, and second means independent of the first means and responsive to the arc current and to changes in the arc current from a predetermined current for controlling the speed of the other of said pair of motors to maintain the arc current at substantially the predetermined current.

3. In an arc furnace including a crucible for holding a pool of molten metal therein, a consumable electrode constructed and arranged to be moved toward and away from the crucible and a source of electric current connected between the crucible and the end of the electrode remote from the crucible forming an arc between the electrode and the molten pool, the combination which comprises a pair of electric motors constructed and arranged to rotate continuously in opposite directions to each other, a differential gearing unit interconnecting the motors and having an output shaft, means for connecting the output shaft to the end of the electrode remote from the crucible, current sensing means coupled to the source of electric current for establishing a first voltage representative of the arc current, voltage sensing means independent of the current sensing means and including an impedance element coupled between the crucible and the end of the electrode remote from the crucible for establishing a second voltage representative of the arc voltage, means including amplifying means coupled to one of said motors and responsive to the first voltage for controlling the speed of said one motor, and means including amplifying means coupled to the other of said pair of motors and responsive to the second voltage for controlling the speed of said other motor.

References Cited in the file of this patent

UNITED STATES PATENTS

| | | |
|---|---|---|
| 1,573,095 | Saklatwalla et al. | Feb. 6, 1926 |
| 2,518,580 | Trofimov | Aug. 15, 1950 |
| 2,640,860 | Herres | June 2, 1953 |
| 2,671,843 | Steele | Mar. 19, 1954 |